(12) United States Patent
He et al.

(10) Patent No.: US 9,052,061 B2
(45) Date of Patent: Jun. 9, 2015

(54) WELL GATE VALVE GREASING TOOL AND METHOD OF USE

(71) Applicant: GE Oil & Gas Pressure Control LP, Houston, TX (US)

(72) Inventors: Henry He, Edmonton (CA); Scott Thistle, Brooks (CA); Christina L. Shannon, Edmonton (CA)

(73) Assignee: GE Oil & Gas Pressure Control LP, Houston, TX (US)

( * ) Notice: Subject to any disclaimer, the term of this patent is extended or adjusted under 35 U.S.C. 154(b) by 218 days.

(21) Appl. No.: 13/672,479

(22) Filed: Nov. 8, 2012

(65) Prior Publication Data

US 2014/0124298 A1    May 8, 2014

(51) Int. Cl.
| | |
|---|---|
| *F16N 13/08* | (2006.01) |
| *F16N 3/10* | (2006.01) |
| *E21B 34/00* | (2006.01) |
| *F16K 3/36* | (2006.01) |
| *F16N 1/00* | (2006.01) |
| *F16N 21/00* | (2006.01) |

(52) U.S. Cl.
CPC . *F16N 3/10* (2013.01); *E21B 34/00* (2013.01); *F16K 3/36* (2013.01); *F16N 1/00* (2013.01); *F16N 21/00* (2013.01)

(58) Field of Classification Search
USPC .................. 184/24, 28, 38.1, 38.2, 38.3, 38.4
See application file for complete search history.

(56) References Cited

U.S. PATENT DOCUMENTS

| | | | | |
|---|---|---|---|---|
| 240,214 | A * | 4/1881 | Winslow | 184/38.3 |
| 966,861 | A * | 8/1910 | Rubly | 222/326 |
| 1,111,755 | A | 9/1914 | McDaniel | |
| 1,217,951 | A | 3/1917 | Jones et al. | |
| 1,435,276 | A * | 11/1922 | Bignell | 184/38.1 |
| 1,465,253 | A * | 8/1923 | Cummins | 184/38.4 |
| 1,723,437 | A * | 8/1929 | Owens | 184/105.3 |
| 2,105,491 | A * | 1/1938 | Huffman | 184/55.2 |
| 2,232,520 | A | 2/1941 | Gray | |
| 2,348,642 | A | 5/1944 | Penick et al. | |
| 3,055,632 | A * | 9/1962 | Scaramucci | 251/266 |
| 3,175,473 | A * | 3/1965 | Boteler et al. | 92/128 |
| 3,595,340 | A * | 7/1971 | Obergefell et al. | 184/28 |

(Continued)

FOREIGN PATENT DOCUMENTS

GB    2350412 A    11/2000

OTHER PUBLICATIONS

API 6A Mud Valves (Complete Solutions for Industrial Valves)—Neway Valve, Cat. No. E-MV-2004, pp. 1-4.

(Continued)

*Primary Examiner* — William E Dondero
*Assistant Examiner* — Minh Truong
(74) *Attorney, Agent, or Firm* — Bracewell & Giuliani LLP (57) ABSTRACT

A grease tool lubricates a valve having an actuator assembly for moving a valve element of the valve. The tool has a housing with a piston carried in a bore. The housing is open for inserting and sealing a portion of the actuator assembly into the bore. A fill port in the housing allows grease to be introduced into the bore. A piston rod joins the piston and has external threads engaging internal threads of the housing, so that rotating the piston rod causes the piston to move axially. A lever is mounted to the housing for imparting rotation to the housing. A lock pin extends through a side wall of the housing to engage the actuator assembly to cause the actuator assembly to rotate in unison with the housing.

17 Claims, 5 Drawing Sheets

(56) References Cited

U.S. PATENT DOCUMENTS

| | | | |
|---|---|---|---|
| 3,889,922 A * | 6/1975 | Peters | 251/14 |
| 3,938,623 A * | 2/1976 | Winston et al. | 184/38.1 |
| 3,958,592 A * | 5/1976 | Wells et al. | 137/315.3 |
| 4,014,514 A * | 3/1977 | Priese et al. | 251/331 |
| RE34,391 E * | 9/1993 | Blake | 184/5.1 |
| 7,337,805 B2 * | 3/2008 | Brown et al. | 137/625.33 |
| 7,997,983 B2 | 8/2011 | Marks et al. | |
| 2011/0240126 A1 * | 10/2011 | Lymberopoulos et al. | 137/1 |

OTHER PUBLICATIONS

International Search Report and Written Opinion issued in connection with corresponding Application No. PCT/US2013/067727 on Oct. 8, 2014.

* cited by examiner

WELL GATE VALVE GREASING TOOL AND METHOD OF USE

FIELD OF THE DISCLOSURE

This invention relates in general to well gate valves and in particular to a tool for unfreezing and lubricating a gate valve.

BACKGROUND

Oil field valves are widely used for production of oil and gas. One type of valve commonly used is a non rising stem gate valve. The actuator to move the gate has a handle that rotates a threaded translation sleeve, causing a non rotating stem inside the sleeve to move the gate. These valves have grease zerk fittings on the valve handles to grease the moving parts of the actuator. However, it is common for the valves to seize. Inspection of a seized valve often shows the actuator assembly is corroded or seized due to a lack of lubrication.

Once seized, they often must be disconnected from the wellhead equipment and replaced. Replacing these valves is not an easy task, requiring service professionals and a large investment. Even though some of the valves can be taken apart and reconditioned at a service facility, the servicing cost is still high considering that the valves have to be removed and transported to a service facility.

SUMMARY

An apparatus is disclosed for lubricating a valve. The valve has an actuator assembly that moves a valve element when rotated. The actuator assembly also has a grease injection passage. The apparatus comprises a housing having first and second ends and a cylindrical bore with an axis. A piston is carried in the bore for axial movement relative to the housing. The second end of the housing is open for inserting, the actuator assembly into the bore. A seal in the bore adjacent the second end of the housing seals to the actuator assembly to define a grease chamber between the piston and the actuator assembly that is in fluid communication with the grease passage. A fill port in a side wall of the housing allows one to introduce grease into the grease chamber.

A piston rod joins the piston and protrudes from the first end of the housing, so that axially moving the piston rod causes the piston to move in an axial direction relative to the housing to force the grease from the grease chamber through the grease injection passage. A lock member is mounted to the housing for engaging the actuator assembly to cause the actuator assembly to rotate in unison with the housing when the housing is rotated, so as to move the valve element while grease is being forced through the grease injection passage.

The lock member preferably comprises a lock pin that extends through a hole in a side wall of the housing for engaging the actuator assembly of the valve. A lever extends laterally from the housing for imparting rotation to the housing.

The piston rod has external threads, and the bore has internal threads adjacent the first end of the housing that are engaged by the external threads of the piston rod, so that rotation of the piston rod relative to the housing moves the piston axially. Optionally, the piston rotates in unison with the piston rod. Drive flats are on a portion of the piston rod that protrudes from the housing for receiving a tool to impart rotation to the piston rod. The drive flats may be a pair of nuts secured to the external threads of the piston rod.

DETAILED DESCRIPTION OF THE DISCLOSURE

Figure 1:
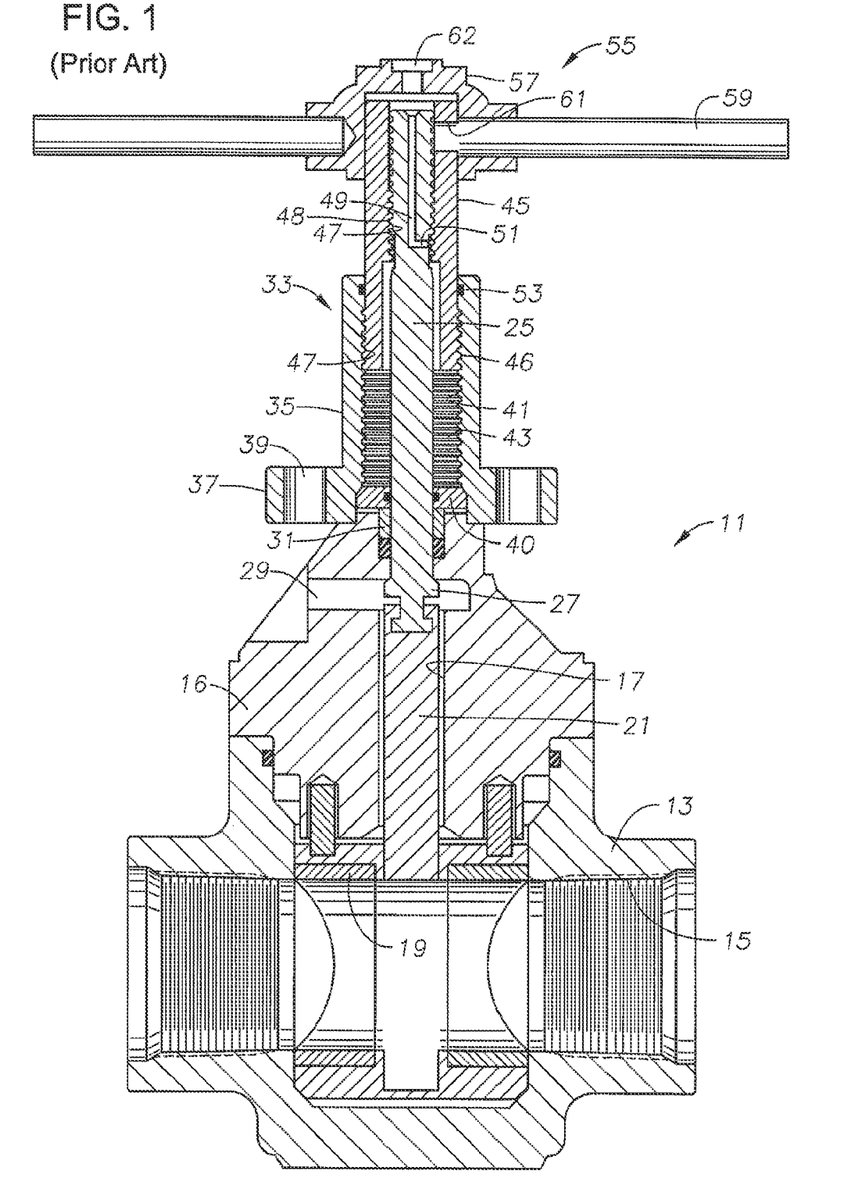
FIG. 1 is a sectional view of a prior art gate valve, shown in a closed position, and capable of being greased with the tool of this disclosure.

Referring to FIG. 1, valve 11 is a typical gate valve, also called a mud valve, used in oil and gas well production. Valve 11 has a body 13 with a transverse flow passage 15. A bonnet 16 secures to body 13 and has a cavity 17 that intersects flow passage 15. Seat rings 19 are mounted in flow passage 15 in alignment with cavity 17. A gate 21 moves linearly from the open position shown in FIG. 1 to the closed position shown in FIG. 2 located between seat rings 19. A non rotating rising stem 25 moves gate 21 in this example and is connected to gate 21 by a T-slot arrangement 27. Gate valves that employ rotating non rising stems are also commonly used. An optional flushing port 29 with a fitting (not shown) allows cleansing fluid to be periodically injected into cavity 17 to remove debris. A stem seal 31 seals between bonnet 16 and stem 25.

An actuator 33 secures to bonnet 16 for moving stem 25 along its axis to open and close gate 21. Actuator 33 includes an actuator housing 35 that has an external flange 37 with bolt holes 39 for bolting to bonnet 16. Actuator housing 35 has internal threads 41 located in a bore or chamber 43. Stem 25 extends through a flange or weather seal 40 at the base of chamber 43. A translation sleeve 45 extends into actuator housing bore 35 and has external threads 46 that engage internal threads 41. Translation sleeve 45 also has internal threads 47 in an upper portion of its interior. Stem 25 has external threads 48 that engage internal threads 47 in translation sleeve 45. A grease injection passage 49 extends within stem 25 from the outer end of stem 25 to an outlet 51 located on a side surface of stem 25 below stem threads 48. Grease injection passage 49 is normally open. A seal 53 seals between translation sleeve 45 and actuator housing 35.

A valve handle 55 mounts to the outer end of translation sleeve 53. Valve handle 55 has a hub 57 and outward extending spokes 59. One of the spokes 59 has an inner end that extends into a hole 61 in translation sleeve 53 to cause translation sleeve 53 to rotate when handle 55 is rotated. Hub 57 has a hole 62 for receiving a grease zerk fitting to introduce grease into injection passage 49.

Figure 2:
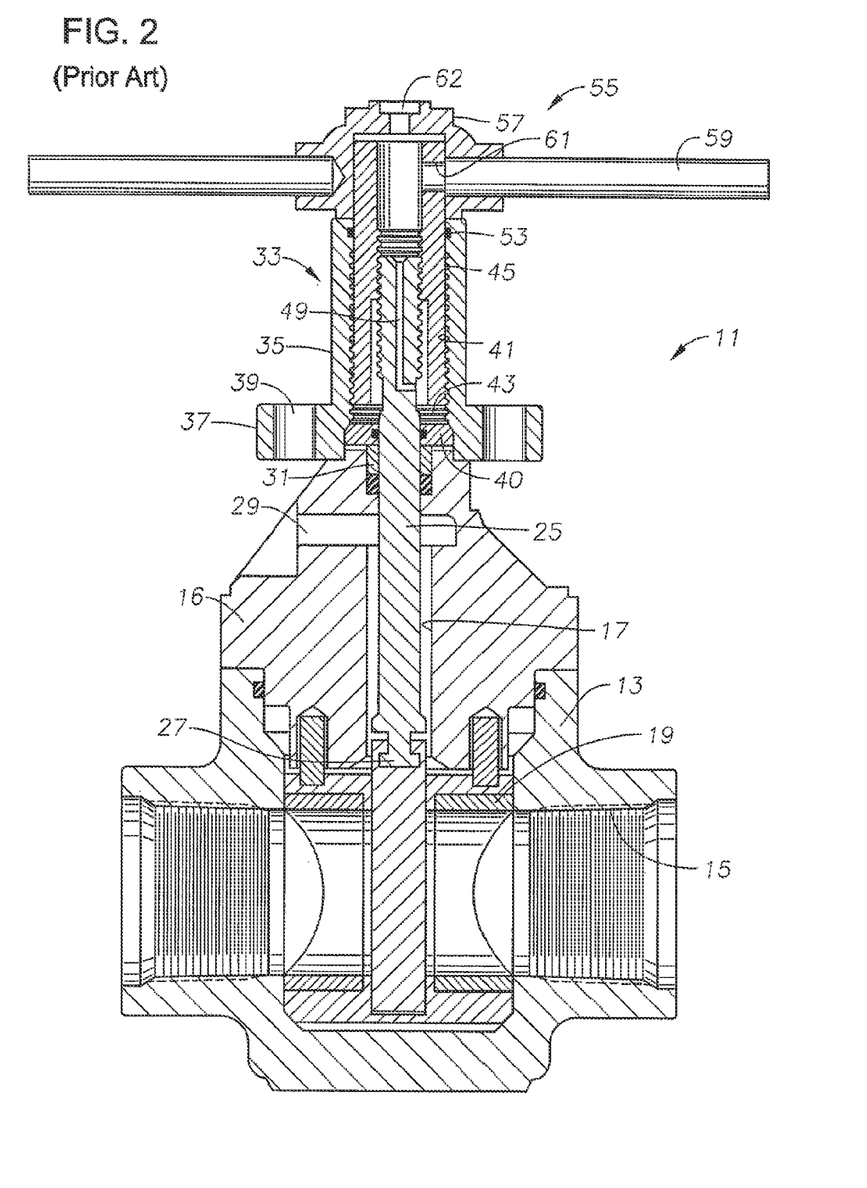
FIG. 2 is a sectional view of the gate valve of FIG. 1, shown in an open position.

As can be seen by comparing FIGS. 1 and 2, rotating handle 59 in one direction causes translation sleeve 45 to rotate while stem 25 and actuator housing 35 do not rotate. The rotation causes stem 25 to move inward, moving gate 21 to the closed position. Translation sleeve 45 also moves inward into actuator housing bore 43, reducing the volume of actuator housing chamber 43. Rotating in the opposite direction causes the reverse to occur.

Figure 3:
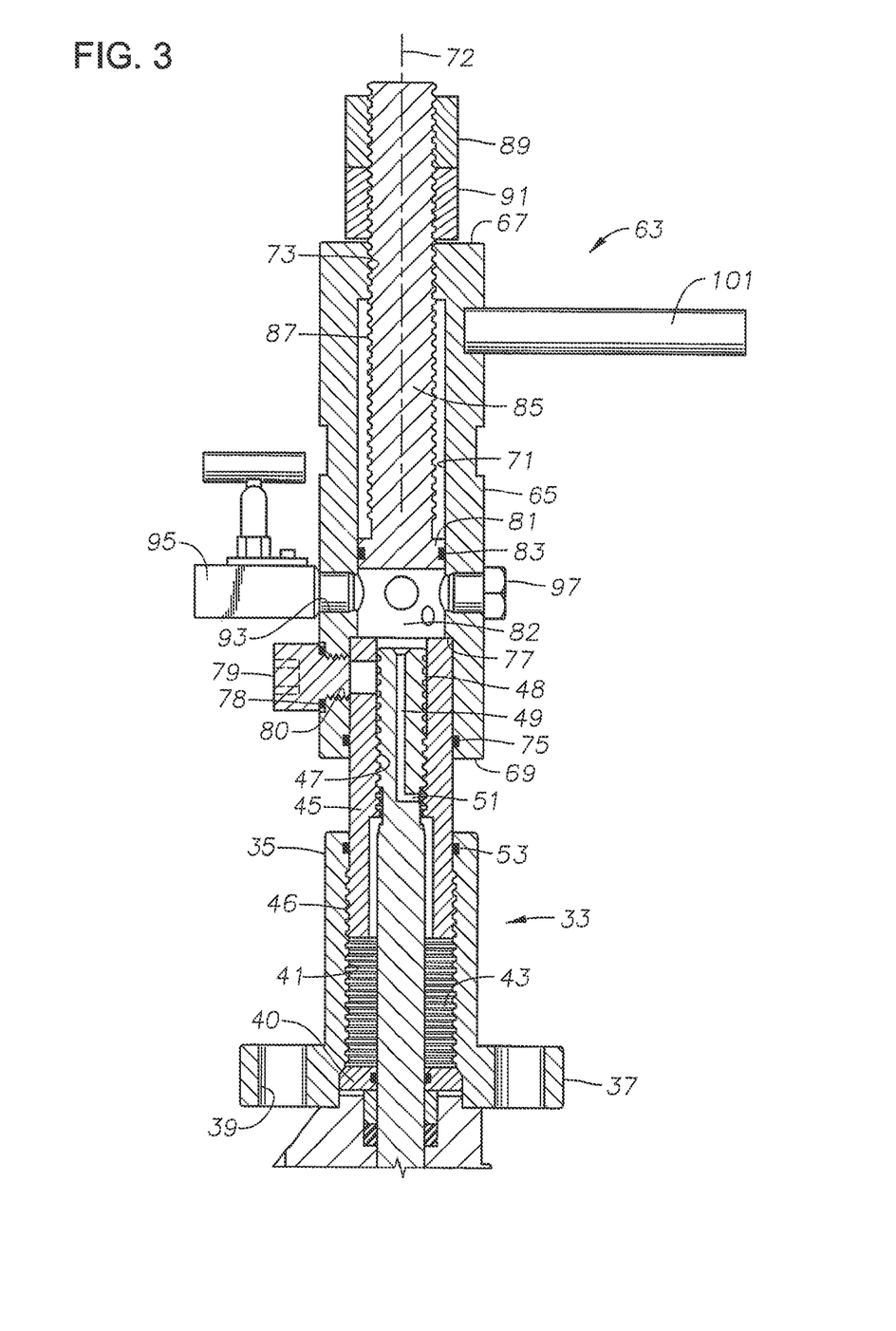
FIG. 3 is a sectional view of a greasing tool for greasing the gate valve of FIG. 1, shown coupled to the gate valve of FIG. 1.
Figure 4:
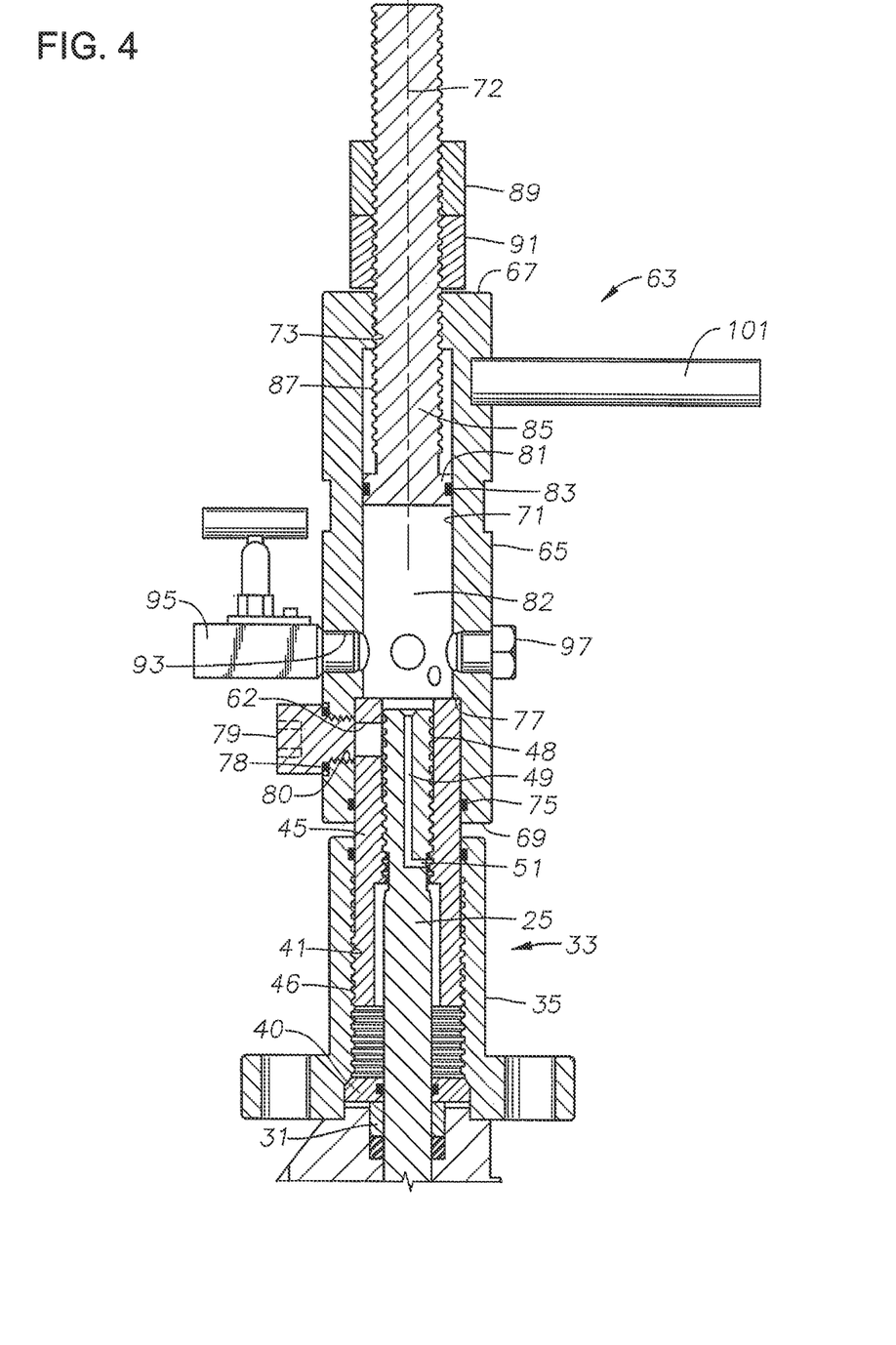
FIG. 4 is a sectional view of the greasing tool of FIG. 3, shown with its piston and housing in a retracted position.

Referring to FIG. 3, valve greasing tool 63 has a cylindrical housing 65 with a first end 67 and a second end 69. A bore 71 extends along a longitudinal axis 72 between first end 67 and second end 69. Internal threads 73 are located in bore 71 near first end 67. A seal 75 in bore 71 near second end 69 will seal around an exterior part of translation sleeve 45 that protrudes from actuator housing 35. Tool housing 65 also has an internal shoulder 77 in bore 71 that abuts the rim of translation sleeve 35 when inserted into bore 71.

A lock pin 79 extends through a threaded hole 80 in the side wall of tool housing 65 and has an inner end that extends into hole 61 in translation sleeve 45. Hole 61 is the same hole that is engaged by valve handle 55 when greasing tool 63 is not being used. Lock pin 79 locks tool housing 65 to translation sleeve 45 for rotation in unison. Lock pin 79 has a seal 78 that seals lock pin 79 within threaded hole 80.

A piston 81 is carried in tool housing 65 for movement along axis 72. Piston 81 has a seal 83 that slidingly engages and seals to tool housing bore 71. Piston 81 defines one end of a fluid injection chamber 82 in bore 71, with the other end being translation sleeve 45 and stem 25. The maximum volume of fluid injection chamber 82 occurs when piston 81 is at the upper end of bore 71. The maximum volume of fluid injection chamber 82 is preferably the same as the maximum volume of housing actuator bore 43 when translation sleeve 45 is in the upper position. A piston rod 85 extends from piston 81 and has external threads 87 that engage bore internal threads 73. Piston rod 85 may be integrally formed with piston 81, as shown, or it may be a separate member connected by a rotational arrangement that allows piston rod 85 to rotate relative to piston 81.

Piston rod 85 protrudes from first end 67 of tool housing 65 and has a drive flat arrangement on its outer end for receiving a tool to impart rotation to piston rod 85. In this example, the drive flat arrangement comprises two threaded nuts 89, 91 that engage piston rod threads 87 and have drive flats on their exteriors. To impart torque, nuts 89, 91 are placed in abutment with each other. Rotating drive nut 89 into abutment with drive nut 91 and continuing rotation causes piston rod 85 to rotate in one direction. Similarly, rotating drive nut 91 into abutment with drive nut 89 and continuing rotation causes piston rod 85 to rotate in the opposite direction. A conventional wrench is used to engage drive nuts 89, 91. As an alternate to drive nuts 89, 91, flats could be formed directly on piston rod 85.

Figure 5:
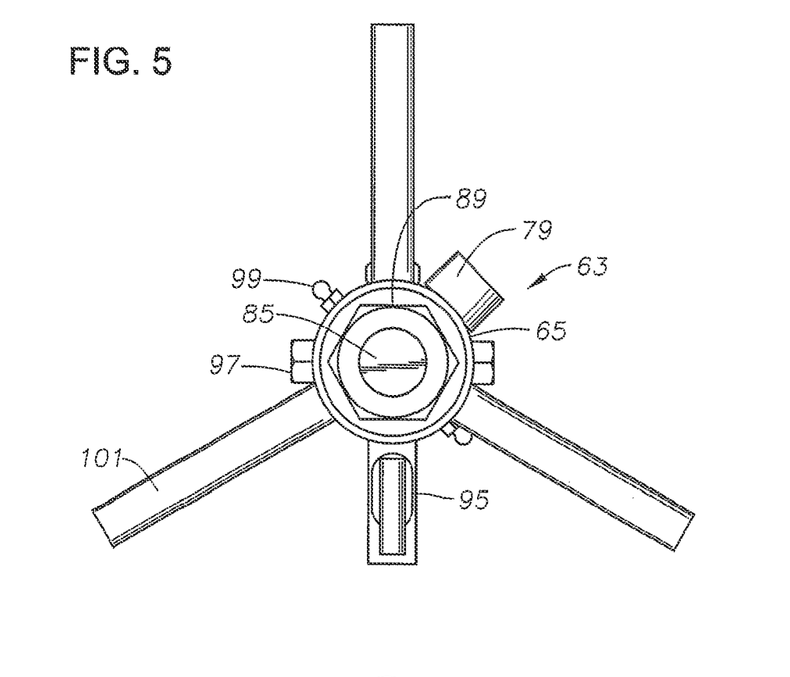
FIG. 5 is top view of the greasing tool of FIG. 3.

One or more fill ports 93 extend through the side wall of tool housing 65 at a point between internal shoulder 77 and piston 81. Fill ports 93 are employed to introduce fluid into fluid injection chamber 82. The operator may secure a needle valve 95 to one of the fill ports 93 to control the injection of fluid into fluid injection chamber 82. A conventional pump (not shown) may be used to inject the fluid through needle valve 95. Several fill ports 93 are illustrated in FIG. 5, so as to give an operator an option of where to conveniently attach needle valve 95. Plugs 97 close off the fill ports 93 not connected to needle valve 95. Also, tool 63 has several grease zerk fittings 99 to allow an operator to use a conventional grease gun to inject grease into fluid injection chamber 82.

Figure 6:
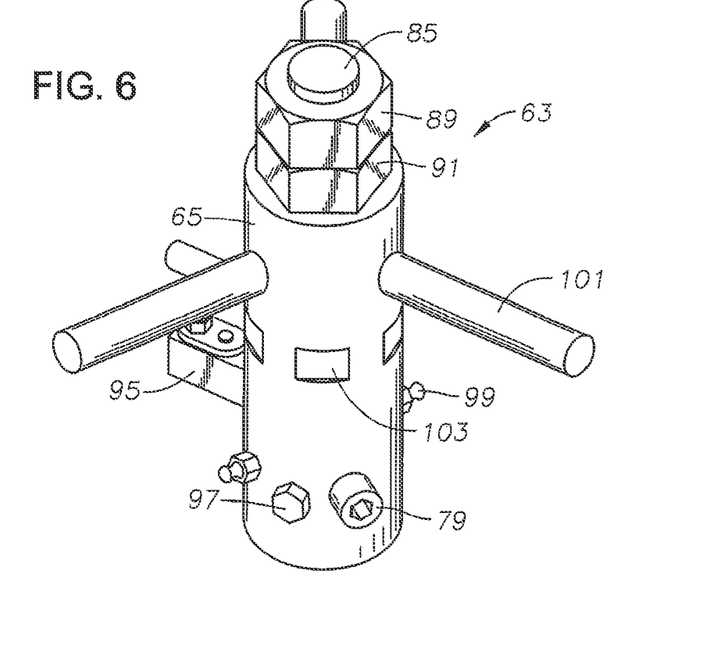
FIG. 6 is a perspective view of the greasing tool of FIG. 3.

Torque is also intended to be imposed on tool housing 65 during the servicing process. To facilitate the rotation, levers or bars 101 secure to tool housing 65 and extending radially outward. In addition, drive flats 103 (FIG. 6) are formed on the exterior of tool housing 65 to give an operator an option of using a wrench, rather then using levers 101.

In operation, normally valve 11 will be seized in an open position, preventing it from closing. The operator removes valve handle 55 and opens one of the tool fill ports 93, such as by removing one the plugs 97. With piston rod 85 in it outer position fully retracted, the operator inserts tool housing 65 over translation sleeve 45. Seal 75 seals to the outer diameter of translation sleeve 45, and the open fill port 93 facilitates installing tool housing 65 by allowing air within fluid injection chamber 82 to be displaced. Normally, valve 11 is oriented horizontally, thus tool axis 72 will be horizontal. Preferably, the operator orients needle valve 95 so that it is on an upper side of tool housing 65. The operator screws lock pin 79 into threaded hole 80 and into hole 61 in translation sleeve 45. The operator re-installs plug 97 and fills fluid injection chamber 82 with a rust dissolving solvent through needle valve 95 or another fill port 93. It is not necessary that fluid injection chamber 82 be completely filled with the solvent, but it is preferable.

The operator then uses a wrench to engage drive nut 89 to rotate piston rod 85. This rotation advances piston rod 85 and piston 81 axially inward, forcing the solvent through grease passage 49 and out outlet 51. The solvent flows into the interior of translation sleeve 45 and actuator housing chamber 43. Solvent also flows into contact with threads 47, 48 between stem 25 and translation sleeve 45 and into contact with threads 41, 46 between translation sleeve 45 and actuator housing 35. When piston rod 85 is in its inner position, shown in FIG. 3, actuator housing chamber 43 should be completely filled with the solvent. The solvent is retained within actuator housing chamber 43 by weather seal 40 and normally does not flow into contact with or past stem seal 31 into cavity 17. Because valve 11 is in an open position, actuator housing chamber 43 will be in its maximum volume position.

After moving piston rod 85 to the inner position, the operator typically waits about ten to fifteen minutes for the solvent to dissolve the rust. Then the operator begins rotating tool housing 65 to impart rotation to translation sleeve 45. It may be necessary to initially rotate tool housing 65 back and forth. Piston rod 85 may still be in its inner position during rotation of tool housing 65. Eventually, the operator should be able to rotate tool housing 65 and translation sleeve 45 until translation sleeve 45 is in its inner position and gate 21 closed, as shown in FIG. 2. While doing so, actuator housing chamber 43 decreases in volume. The operator opens needle valve 95 to allow the displaced solvent in actuator housing chamber 43 to flow through grease injection passage 49 out needle valve 45 and onto an absorbent pad placed below tool 63.

The operator then retracts piston rod 85 to its outer position, which provides a maximum volume again for fluid injection chamber 82. The operator also rotates tool housing 65 to open valve 11. Rotation of tool housing 65 causes translation sleeve 45 to advance to its outer position, shown in FIG. 3, which provides the maximum volume for actuator housing chamber 43. The operator then introduces grease into tool housing chamber 82, such as by a grease gun through one of the zerk fittings 99. The amount of grease introduced may be sufficient to completely fill tool housing chamber 82. The operator then rotates piston rod 85 to advance piston 81 inward. Piston 81 forces the grease through grease injection passage 49 and into actuator housing chamber 43. The operator may then rotate piston rod 85 in the opposite direction to move piston rod 85 to its outer position and increase the volume of grease injection chamber 82 to its maximum amount. Once piston rod 85 is back in its outer position, grease injection chamber 82 should be mostly empty since the grease will have already been forced through grease injection passage 49 into actuator housing chamber 43. The operator then may rotate tool housing 65 to causes actuator sleeve 45 to again move inward, closing valve 11. When doing so, some of the grease contained in actuator housing chamber 43 will be displaced back through grease injection passage 49 into fluid injection chamber 83. Then operator may then remove injection tool 63 from actuator 63 and re-install valve handle 55. The amount of grease retained in actuator 33 will be approximately equal to the volume of actuator housing chamber 43 while valve 11 is in its closed position. The operator can then use valve handle 55 to again open valve 11.

The greasing tool is easy to use and works well to unfreeze and lubricate oil field valves. Freeing up valves that have seized up greatly reduces the cost of replacing the valves. The servicing can be done on site while the valve is still coupled to wellhead equipment.

While the invention has been shown in only one of its forms, it should be apparent to those skilled in the art that it is not so limited but is susceptible to various changes without departing from the scope of the disclosure.

The invention claimed is:

1. An apparatus for lubricating a valve having an actuator assembly that moves a valve element when rotated, the actuator assembly having a grease injection passage, the apparatus comprising:
 a housing having first and second ends and a cylindrical bore with an axis;
 a piston carried in the bore for axial movement relative to the housing;
 the second end of the housing being open for inserting a portion of the actuator assembly into the bore;
 a seal in the bore adjacent the second end of the housing for sealing to the portion of the actuator assembly to define a fluid injection chamber between the piston and the actuator assembly in fluid communication with the grease passage;
 a fill port in a side wall of the housing for introducing a fluid into the fluid injection chamber;
 a piston rod joining the piston and protruding from the first end of the housing, so that axially moving the piston rod causes the piston to move in an axial direction relative to the housing to force the fluid from the fluid injection chamber through the grease injection passage;
 a lock member mounted to the housing for engaging the portion of the actuator assembly to cause the portion of the actuator assembly to rotate in unison with the housing in first and second directions when the housing is rotated in first and second directions; and
 drive means on the housing for imparting torque to the housing to rotate the housing and the portion of the actuator assembly in unison in the first and second directions, wherein the drive means comprises a lever extending laterally from the housing for imparting rotation to the housing.

2. The apparatus according to claim 1, where the lock member comprises:
 a lock pin that releasably extends through a hole in a side wall of the housing and has a nose protruding inward from the side wall for engaging a mating aperture in the portion of the actuator assembly.

3. The apparatus according to claim 1, wherein:
 the piston rod has external threads; and
 the bore has internal threads adjacent the first end of the housing that are engaged by the external threads of the piston rod, so that rotation of the piston rod relative to the housing moves the piston axially.

4. The apparatus according to claim 3, further comprising drive flats on a portion of the piston rod that protrudes from the housing for receiving a tool to impart rotation to the piston rod.

5. The apparatus according to claim 3, further comprising a pair of nuts secured to the external threads of the piston rod for receiving a tool to impart rotation to the nuts, the nuts being in abutment with each other, thereby causing the piston rod to rotate in a first direction when torque is applied to a first one of the nuts, but not a second one of the nuts, in the first direction and causing the piston rod to rotate in a second direction when torque is applied to the second one of the nuts, but not the first one of the nuts, in the second direction.

6. The apparatus according to claim 1, wherein:
 the housing has a side wall with a threaded hole that is positioned to align with an aperture in the portion of the actuator assembly when the portion of the actuator assembly is inserted into the bore; and
 the lock member comprises a threaded pin that engages the threaded hole and has a protruding nose that enters the aperture to secure the housing to the actuator assembly.

7. The apparatus according to claim 1, further comprising:
 an outlet port in the side wall of the housing for allowing in fluid in the housing and in the actuator assembly to be expelled when the portion of the actuator assembly is rotated in one direction;
 a needle valve that secures to the outlet port to control the fluid being expelled.

8. A method of freeing up and greasing a valve having an actuator assembly that when rotated, causes movement of a valve element between open and closed positions, the actuator assembly having a grease injection passage, the method comprising:
 placing a piston in a bore of a housing having a longitudinal axis, the piston having a piston rod protruding from a first end of the housing;
 inserting the actuator assembly into a second end of the housing and sealing the actuator assembly to the bore to define a fluid injection chamber between the piston and the actuator assembly that is in fluid communication with the grease passage;
 locking the housing to the actuator assembly so that rotation of the housing in first and second directions rotates the actuator assembly in first and second directions;
 with the piston rod in an outer position, introducing a rust dissolving solvent into the fluid injection chamber;
 while the valve element is in an open position, axially moving the piston rod to an inner position to force the solvent from the fluid injection chamber through the grease injection passage into the actuator assembly; then
 rotating the housing and the actuator assembly with a lever extending laterally from the housing in unison in the first direction, causing the actuator assembly to close the valve element and expel the solvent from the actuator assembly back through the grease injection passage into the fluid injection chamber;
 removing the solvent from the fluid injection chamber; then
 with the piston rod in the outer position, introducing grease into the fluid injection chamber;
 rotating the housing and the actuator assembly with the lever in unison in the second direction, causing the actuator assembly to open the valve element;
 with the valve element in the open position, axially moving the piston rod to the inner position, forcing the grease in the fluid injection chamber through the grease injection passage into the actuator assembly; then
 rotating the housing and the actuator assembly in unison again in the first direction, to cause the actuator assembly to again close the valve element and expel excess grease from the actuator assembly back through the grease injection passage into the fluid injection chamber; then
 removing the housing from the actuator assembly.

9. The method according to claim 8, further comprising removing a valve handle from the actuator assembly before inserting the actuator assembly into the second end of the housing.

10. The method according to claim 9, wherein:
the valve handle has an inner portion that engages an aperture in a side wall of the actuator assembly; and
locking the housing to the actuator assembly comprises inserting a lock pin through a hole in a side wall of the housing into engagement with the aperture in the side wall of the actuator assembly.

11. The method according to claim 8, wherein:
rotating the housing and the actuator assembly in the first direction to close the valve element decreases a volume of an actuator housing chamber; and
rotating the housing and the actuator assembly in the second direction to open the valve element increases the volume of the actuator housing chamber.

12. The method according to claim 8, wherein:
the piston is in the inner position while the housing and the actuator assembly are rotated in the first direction to expel the solvent from the actuator assembly.

13. The method according to claim 8 wherein removing the solvent from the fluid injection chamber comprises flowing the solvent through an outlet port provided in the housing and controlling the flow of the solvent through the outlet port with a needle valve.

14. A method of servicing a valve having a stem connected to a valve element, the stem being movable axially along a stem axis between an outer position and an inner position, a translation sleeve that engages the stem and causes axial movement of the stem in response to rotation of the sleeve, the stem having a grease injection passage extending into an outer end of the stem to an actuator chamber surrounding the stem, the method comprising:
(a) placing a piston in a bore of a housing having a longitudinal axis;
(b) inserting the translation sleeve into an end of the housing and sealing the translation sleeve to the bore to define a fluid injection chamber between the piston and the outer end of the stem that is in fluid communication with the grease passage;
(c) locking the housing to the translation sleeve for rotation in unison;
(d) with the piston in a retracted position, introducing a rust dissolving solvent into the fluid injection chamber;
(e) while the stem is in the outer position, axially moving the piston to an extended position, opposite to the retracted position, to force the solvent from the fluid injection chamber through the grease injection passage into the actuator chamber; then
(f) rotating the housing and the translation sleeve with a lever extending laterally from the housing in unison in a first direction, causing the stem to move to the inner position, which reduces a volume of the actuator chamber and expels the solvent from the actuator chamber back through the grease injection passage into the fluid injection chamber;
(g) removing from the housing the solvent that has returned to the fluid injection chamber; then
(h) rotating the housing and the translation sleeve with the lever in unison in a second direction, causing the stem to move again to the outer position;
(i) placing the piston in the retracted position and introducing grease into the fluid injection chamber; then
(j) axially moving the piston again to the extended position, forcing the grease in the fluid injection chamber to flow through the grease injection passage into the actuator chamber; then
(k) rotating the housing and the translation sleeve in unison again in the first direction, causing the stem to move back to the inner position, which reduces the volume of the actuator chamber and expels excess grease from the actuator chamber back through the grease injection passage into the fluid injection chamber; then
(l) removing the housing from the actuator assembly.

15. The method according to claim 14, further comprising:
removing a valve handle from an aperture in the translation sleeve before inserting the translation sleeve into the end of the housing in step (b); and wherein
step (c) comprises inserting a lock pin through a hole in a side wall of the housing into engagement with the aperture in the side wall of the translation sleeve.

16. The method according to claim 14, wherein:
the piston is in the extended position during step (f).

17. The method according to claim 14 wherein step (g) comprises flowing the solvent through an outlet port provided in the housing and controlling the flow of the solvent through the outlet port with a needle valve.

* * * * *